W. A. BARLOW.
ATTACHING KNOBS TO THEIR SHANKS.
No. 189,012.   Patented April 3, 1877.
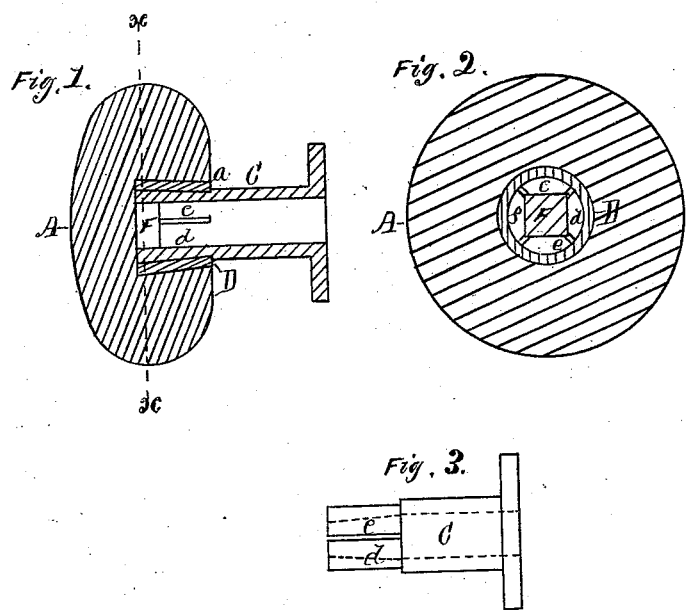

UNITED STATES PATENT OFFICE

WILLIAM A. BARLOW, OF CHICAGO, ILLINOIS.

IMPROVEMENT IN ATTACHING KNOBS TO THEIR SHANKS.

Specification forming part of Letters Patent No. 189,012, dated April 3, 1877; application filed August 17, 1876.

*To all whom it may concern:*

Be it known that I, WILLIAM A. BARLOW, of Chicago, in the county of Cook and State of Illinois, have invented a new and useful Improvement in Door-Knobs; and I do hereby declare the following to be a full, clear, and exact description thereof, which will enable others skilled in the art to which it appertains to make and use the same, reference being had to the accompanying drawing, forming part of this specification, in which—

Figure 1 represents a central section of a door-knob embodying my said invention. Fig. 2 represents a transverse section of the same on the line $x$ $x$, Fig. 1; and Fig. 3 represents an isometrical view of the shank detached.

Like letters of reference indicate like parts.

My invention relates to the means employed for securing the shank within the knob; and the object of my invention is to simplify the means heretofore employed, and to render the shank more firm and secure.

In the drawing, A represents the knob proper, which is made of any of the material commonly used. C is the shank, which is provided with a central cavity to receive the spindle, in the usual manner. The knob A is provided on one side and at its center with an annular cavity, $a$, extending partly through the same, in the usual manner, the wall of said cavity being undercut or dovetailed, as shown in Fig. 1. D is a soft-metal ring, which is of the proper diameter to fit around the shank C, and within the cavity $a$ in the knob, and of the proper length to extend from the outer surface of the knob to the end of the cavity. This ring is made preferably of lead, but may be made of india-rubber, leather, or any other suitably flexible material, if desired. The inner end of the shank is slotted, as shown in Figs. 2 and 3, forming four parts, $c$ $d$ $e f$, more or less, and the cavity in the shank is tapered at its inner end, so that its diameter is less than the diameter of the cavity at the outer end of the shank, as shown by dotted lines, Fig. 3. F is a metal key, which is of the proper shape and size to fit the cavity in the outer end of the shank, and to admit of being driven through said cavity, so as to spring or expand the parts $c$ $d e f$ outward when the key is in contact with the walls of the cavity at the inner end of the shank.

To secure the shank within the knob the ring D is first arranged upon the end of the shank, and then inserted within the cavity in the knob. The key F is then driven through the cavity in the shank, so as to rest against the end wall of the cavity in the knob, and, by the contact of the key against the inclined or tapering surface of the walls of the cavity in the shank, the parts $c$ $d$ $e f$ are forced outward, so as to compress the ring D firmly between their outer surface and the wall of the cavity in the knob, and thereby securing the shank within the knob, so as to prevent it from being loosened or drawn out.

My invention may be used to secure iron fence-posts within a stone foundation, or for other similar purposes; hence I do not limit myself to its use in the manufacture of door-knobs only, as I intend to use the same for other purposes.

Having thus described my invention, what I claim as new, and desire to secure by Letters Patent, is—

1. The combination, with the knob A, of the slotted shank C, ring D, and key F, substantially as and for the purpose set forth.

2. In a door-knob, the combination, with the tapering mortise formed within the shank C, of the key F, adjusted to pass through said mortise from the inner end of the shank, substantially as and for the purpose specified.

WILLIAM A. BARLOW.

Witnesses:
N. H. SHERBURNE,
JOHN H. FOSTER.